(12) United States Patent  
Noda

(10) Patent No.: US 6,463,631 B2  
(45) Date of Patent: Oct. 15, 2002

(54) BINDING TOOL

(75) Inventor: Naoya Noda, Nagoya (JP)

(73) Assignee: Kitagawa Industries Co., Inc., Nagoya (JP)

( * ) Notice: Subject to any disclaimer, the term of this patent is extended or adjusted under 35 U.S.C. 154(b) by 0 days.

(21) Appl. No.: 09/854,640

(22) Filed: May 14, 2001

(65) Prior Publication Data

US 2002/0000026 A1 Jan. 3, 2002

(30) Foreign Application Priority Data

May 17, 2000 (JP) .................................... 2000-145039

(51) Int. Cl.[7] ................................................. F16L 3/22
(52) U.S. Cl. ..................... 24/16 R; 248/68.1; 248/74.4; 24/271; 24/272
(58) Field of Search ........................... 24/531, 459, 19, 24/272, 271; 248/70, 71, 74.1, 74.3, 74.4

(56) References Cited

U.S. PATENT DOCUMENTS

| | | | | |
|---|---|---|---|---|
| 3,147,754 A | * | 9/1964 | Koessler | 248/74.4 X |
| 4,244,083 A | * | 1/1981 | Aremka et al. | 24/16 R |
| 4,347,998 A | * | 9/1982 | Loree | 248/68.1 |
| 4,395,009 A | * | 7/1983 | Bormke | 248/68.1 |
| 4,783,029 A | * | 11/1988 | Geppert et al. | 248/74.1 |
| 6,126,121 A | * | 10/2000 | Akizuki | 248/68.1 |
| 6,126,122 A | * | 10/2000 | Ismert | 248/74.1 |

* cited by examiner

*Primary Examiner*—Robert J. Sandy  
(74) *Attorney, Agent, or Firm*—Davis & Bujold, P.L.L.C.

(57) ABSTRACT

A binding tool having a main member and a lateral member for clamping a bundle of cables between a bottom portion of the main member and a lateral bar of the lateral member. A first guide groove and a second guide groove are provided on a first arm portion of the main member and a first insertion hole into which the first arm portion can be inserted is provided on the lateral bar of the lateral member. On portions of the inner face of the first insertion hole corresponding to the first guide groove and the second guide groove, a first engaging protrusion and a second engaging protrusion extending longitudinally are provided, respectively. Both left and right faces of the first engaging protrusion and both left and right faces of the second engaging protrusion are guided in the first guide groove and the second guide groove, respectively.

9 Claims, 9 Drawing Sheets

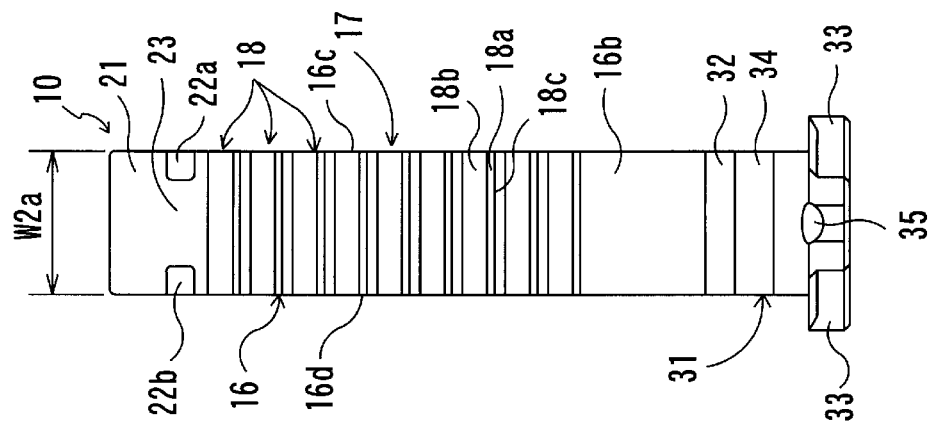
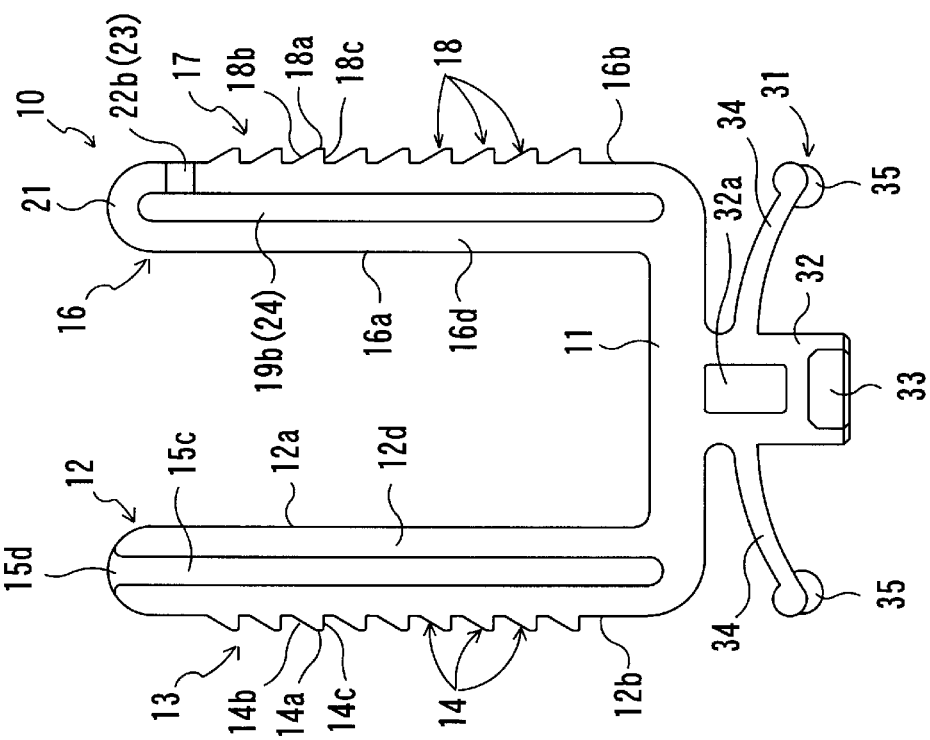
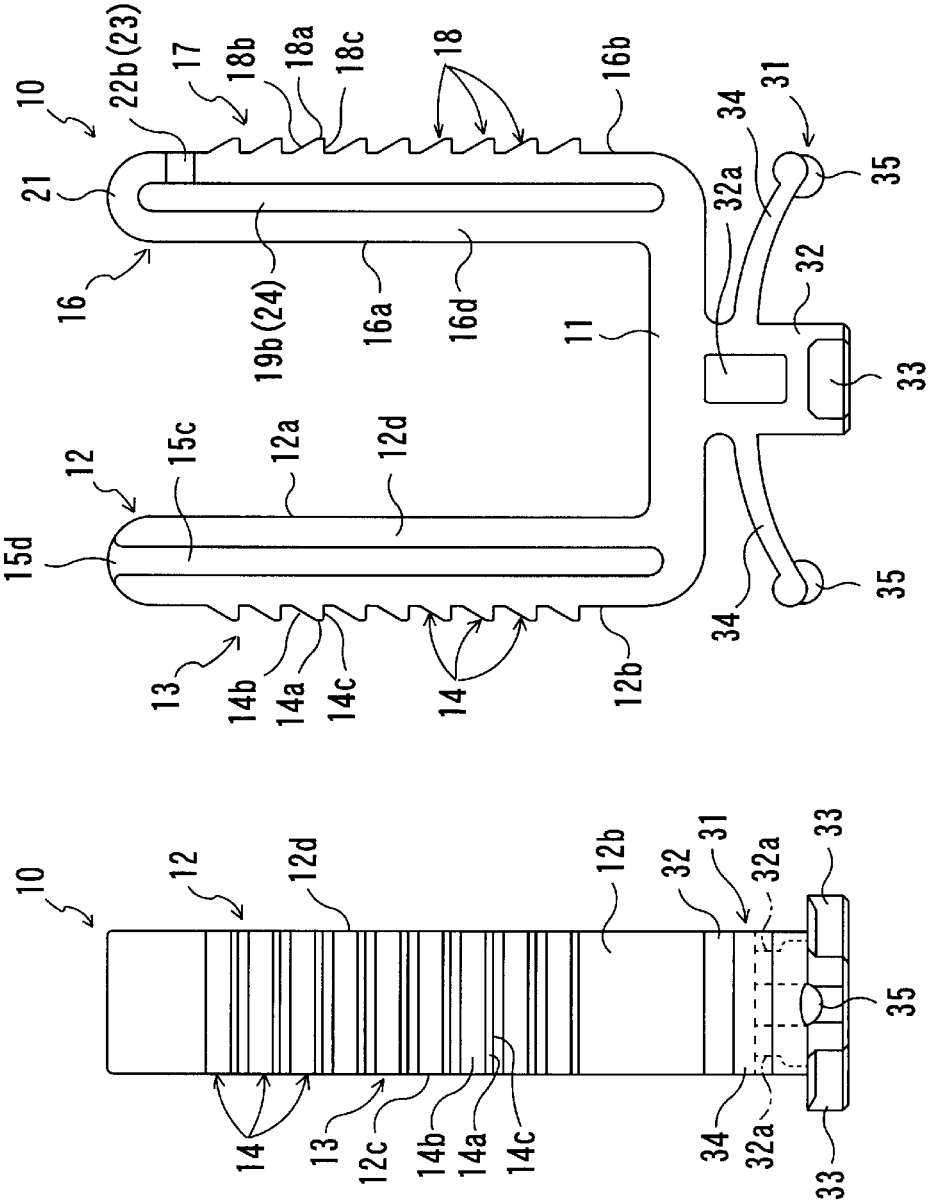

A—A

B—B

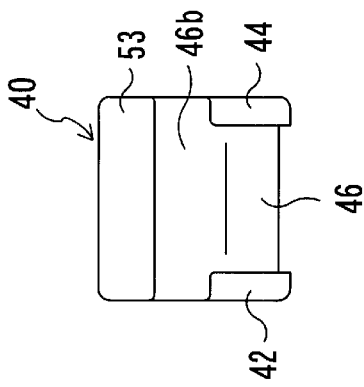
FIG. 5C
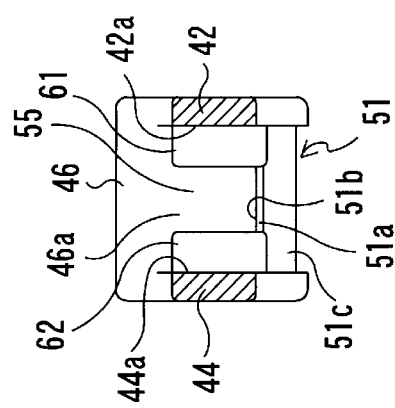
FIG. 5E D-D
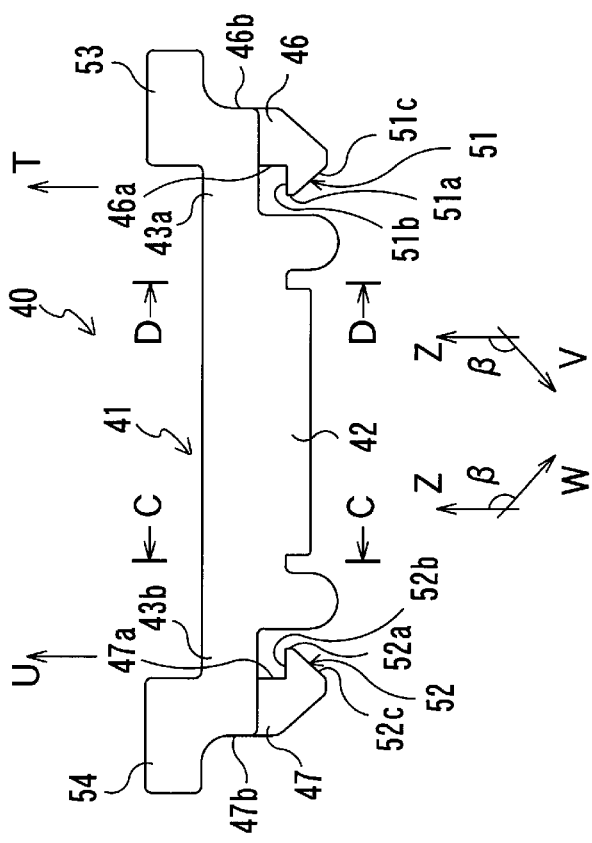
FIG. 5B
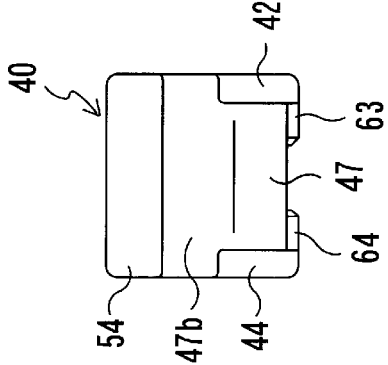
FIG. 5A
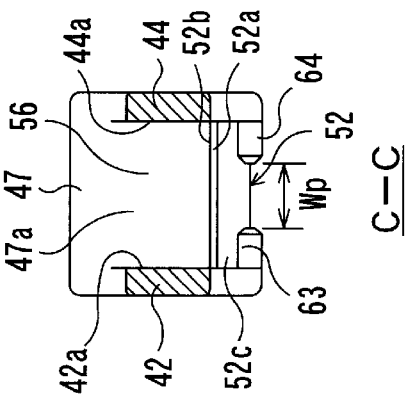
FIG. 5D C-C F I G. 7
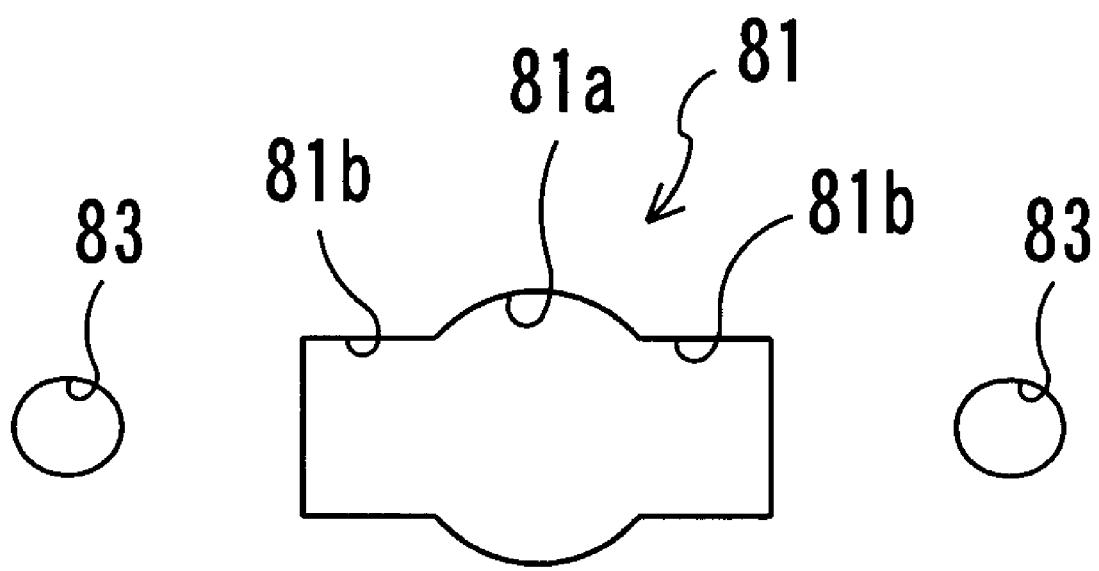

BINDING TOOL

FIELD OF THE INVENTION

This invention relates to a binding tool for binding and fixing a bundle of cables.

BACKGROUND OF THE INVENTION

Heretofore, there are widely used binding tools for binding bundles of cables and fixing them to support members such as chassis and panels.

Some of such binding tools comprise two parts: a main member and a lateral member. In such a binding tool, the main member is provided with a laterally extending bottom portion, first and second arm portions extending upward from right and left ends of the bottom portion, respectively, and first and second sawtooth-like notch portions provided on the first and second arm portions, respectively, as longitudinally continuing notched parts. The lateral member is provided with a lateral bar bridged between the first and second arm portions and first and second engaging pieces provided on right and left ends of the lateral bar, respectively, and constituted to be engaged with the first and second sawtooth-like notch portions, respectively.

The binding tool is used, for example, in the following manner. Firstly, the bottom portion of the main member is fixed to a support with a bolt or the like and a bundle of cables are mounted on the bottom portion. Secondly, the lateral bar is bridged between the first and second arm portions, and the first and second engaging pieces are engaged with the first and second sawtooth-like notch portions, respectively, so that the cables can be clamped between the bottom portion and the lateral bar (lateral member). Consequently, the bundle of cables are bound and fixed to the support.

Specifically, in this binding tool, when the lateral bar is bridged between the first and second arm portions and the lateral member is pushed down relative to the main member with a force larger than a predetermined value, the first and second engaging pieces can be respectively moved downward along the first and second sawtooth-like notch portions with the lateral bar being elastically deformed. And by engaging the first and second engaging pieces with the first and second sawtooth-like notch portions, respectively, at the positions in which the bundle of cables are clamped between the bottom portion and the lateral bar, the bundle of the cables can be bound and fixed to the support.

On the other hand, in order to release the bundle of cables from binding and fixation to the binding tool, the engagements of the first and second engaging pieces with the first and second sawtooth-like notch portions, respectively, are released by elastically deforming the lateral bar with an operator's hand and the like (in more detail, by elastically deforming a part of the lateral bar near the first engaging piece and a part of the lateral bar near the second engaging piece). Then, the lateral member can be removed from the main member.

When this binding tool is used, the bundle of cables can be bound and fixed certainly by varying the distance between the bottom portion and the lateral bar, even if the number or the thickness of the cables to be bound and fixed is changed.

However, as for such a conventional binding tool, there is a problem that use of the tool is occasionally inconvenient because the lateral bar is sometimes slanted off from the lateral direction when the lateral bar is bridged between the first and second arm portions.

Specifically, for example, when the left and right ends of the lateral bar are not pushed down equally to the bottom portion (main member) and the lateral bar is slanted off from the lateral direction, the lateral member is caught on the main member (that is, a frictional force exerted between the first engaging piece and the first sawtooth-like notch portion or a frictional force exerted between the second engaging piece and the second sawtooth-like notch portion becomes too large), and it occasionally becomes difficult for the strength of the operator's hand to push down the lateral member to a desired position. In some other cases, the bundle of cables can not be bound and fixed with a sufficient force because the engagements of the first and second engaging pieces with the first and second sawtooth-like notch portions, respectively, become unstable.

SUMMARY OF THE INVENTION

The present invention is presented to solve the above-mentioned problem and the object of the present invention is to provide a binding tool in which left and right ends of a lateral member can be equally pushed down relative to a main member.

A binding tool of the present invention comprises a main member provided with a bottom portion extending laterally, first and second arm portions extending upward from two positions on the bottom portion laterally spaced out by a predetermined distance, and first and second sawtooth-like notch portions provided on the first and the second arm portions, respectively, as longitudinally continuing notched portions, and a lateral member provided with a lateral bar bridged between the first and the second arm portions for clamping a bundle of cables with the bottom portion and first and second engaging pieces disposed on both left and right ends of the lateral bar, respectively, for engaging with the first and the second sawtooth-like notch portions, respectively, so as to bind and fix the cables between the main member and the lateral member, wherein at least either on the main member or the lateral member, there is provided a slant preventing portion for preventing the lateral bar from being slanted off from the lateral direction, when the lateral bar is bridged between the first and the second arm portions.

According to the binding tool of the present invention, a bundle of cables can be bound and fixed by setting the cables (or the bundle of cables) on the bottom portion fixed to a support member by a predetermined method, bridging the lateral bar between the first and the second arm portions, and engaging the first and the second engaging pieces with the first and the second sawtooth-like notch portions, respectively, so that the cables are clamped between the bottom portion and the lateral bar.

And according to the binding tool of the present invention, even when the thickness or the number of cables is changed, the cables can be bound and fixed certainly by changing engaging positions of the first and the second engaging pieces with the first and the second sawtooth-like notch portions, respectively, to adjust the distance between the bottom portion and the lateral bar.

Moreover, in the binding tool of the present invention, since the slant preventing portion is provided at least on one of the main member and the lateral member, the left and right sides of the lateral bar can be equally pushed down relative to the main member.

Specifically, since the lateral bar is prevented from being slanted off from the lateral direction by the slant preventing portion when the lateral bar is bridged between the first and the second arm portions, the left and right sides of the lateral member can be equally pushed down relative to the main member.

As a result, when the lateral member is pushed down relative to the main member, the lateral member is prevented from being caught on the main member and so the lateral member can be easily pushed down to a desired position with respect to the main member. Furthermore, engagements of the first and the second engaging pieces with the first and the second sawtooth-like notch portions, respectively, do not become unstable and so the cables are bound and fixed with a sufficient force.

In another aspect of the present invention, the slant preventing portion comprises a first engaging protrusion extending longitudinally either on the first arm portion or on the lateral member and a first guide groove provided either on the first arm portion or on the lateral member, on which the first engaging protrusion is not provided, such that the first engaging protrusion can be longitudinally slidably engaged with the groove, and both left and right faces of the first engaging protrusion are guided in the groove when the first engaging protrusion is engaged therewith.

This second aspect shows an embodiment of the slant preventing portion in the binding tool of the present invention and exhibits the same effect as mentioned above.

Since the first engaging protrusion is engaged with the first guide groove movably in the longitudinal direction, as mentioned above, when the lateral bar is bridged between the first and the second arm portions to change the engaging positions of the first and the second engaging pieces with the first and the second sawtooth-like notch portions, respectively, the first engaging protrusion is moved longitudinally along the first guide groove.

And when the lateral bar is thus bridged between the first and the second arm portions and when the engaging protrusion is longitudinally moved, the lateral bar is prevented from being slanted off from the lateral direction, because both left and right faces of the first engaging protrusion are guided in the first guide groove.

Therefore, according to the binding tool of the present invention, the left and right sides of the lateral member can be uniformly pushed down relative to the main member after the lateral bar is bridged between the first and the second arm portions, with a result that the same effect as that of the binding tool of the first aspect of the present invention is attained.

A further aspect of the present invention comprises an insertion hole bored through the lateral member on an end of the lateral member at the first arm portion side so that the first arm portion can be inserted when the lateral bar is bridged between the first and the second arm portions, wherein either the first engaging protrusion or the first guide groove is provided on the inner face of the insertion hole, and either the first engaging protrusion or the first guide groove, which is not provided on the inner face of the insertion hole, is provided on a position of the first arm portion corresponding to either the first engaging protrusion or the first guide groove, which is provided on the inner face.

When the binding tool is constituted in such a way, since the first arm portion is inserted in the insertion hole on bridging the lateral bar between the first and the second arm portions, the lateral member is stably held by the main member and falling off of the lateral member from the main member is avoided after the lateral bar is bridged between the first and the second arm portions.

Since one of the first engaging protrusion and the first guide groove is provided on the inner face of the insertion hole and the other one is provided on the first arm portion, the engagement of the first engaging protrusion and the first guide groove is made in the insertion hole. Therefore, the first engaging protrusion and the first guide groove are not disengaged after the lateral bar is bridged between the first and the second arm portions, as far as the first arm portion is not released from the insertion hole. Accordingly, the lateral member can be uniformly pushed down relative to the main member.

Subsequently, a fourth aspect of the invention comprises a second engaging protrusion extending longitudinally either on a position on the inner face other than the position on which either the first engaging protrusion or the first guide groove is provided, or on a position on the first arm portion other than the position on which either the first engaging protrusion or the first guide groove is provided, and a second guide groove provided on a position on the inner face or on a position on the first arm portion, on which the second engaging protrusion is not provided, such that the second engaging protrusion can be longitudinally movably engaged with the second guide groove, and both left and right faces of the second engaging protrusion are guided in the second guide groove when the second engaging protrusion is engaged therewith.

In the fourth aspect of the invention, since one of the second engaging protrusion and the second guide groove is further provided on the inner face of the insertion hole and the other one is provided on the first arm portion, the second engaging protrusion is engaged with the second guide groove in the insertion hole. Therefore, the lateral member is held by the main member more stably, and the left and right ends of the lateral member can be pushed down relative to the main member more certainly, after the lateral member is bridged between the first and the second arm portions, compared with the case in which only the first engaging protrusion and the first guide groove are engaged in the insertion hole.

In a fifth aspect of the present invention, the first and the second sawtooth-like notch portions are provided on the faces of the first and the second arm portions opposite to the faces of the first and the second arm portions facing to each other, respectively, and the first and the second engaging pieces are provided on positions corresponding to the first and the second sawtooth-like notch portions, respectively.

In such a binding tool, since the first and the second sawtooth-like notch portions are provided on the faces opposite to the faces of the first and the second arm portions facing to each other, the lateral widths of the first and the second arm portions can be lessened, respectively.

Specifically, in the binding tool of this type, the width of the side face of the first arm portion provided with the first sawtooth-like notch portion (that is, thickness of the first arm portion in the transverse direction) and the width of the side face of the second arm portion provided with the second sawtooth-like notch portion (that is, thickness of the second arm portion in the transverse direction) should be relatively large in order to ensure the engagements of the first engaging piece and the second engaging piece with the first sawtooth-like notch portion and the second sawtooth-like notch portion, respectively. On the other hand, the lateral widths of the first and the second arm portions can be lessened as long as there is no problem concerning strength of the material, because the first and the second sawtooth-like notch portions are not provided on them.

Subsequently, in a sixth aspect of the present invention, the first and the second engaging pieces can be moved on the first and the second sawtooth-like notch portions, respectively, accompanied by elastic deformation of the lateral bar when the lateral member is moved downward relative to the main member after the lateral bar is bridged between the first and the second arm portions, and the first and the second engaging pieces are engaged with the first and the second sawtooth-like notch portions, respectively, when the lateral member is moved upward relative to the main member after the lateral bar is bridged between the first and the second arm portions.

According to the binding tool of this type, since the first and the second engaging pieces can be moved on the first and the second sawtooth-like notch portions, respectively, accompanied by elastic deformation of the lateral bar when the lateral member is moved down relative to the main member after the lateral bar is bridged between the first and the second arm portions, operation of downward movement of the lateral member can be easily carried out by one hand of the operator.

Moreover, in the above-mentioned binding tool, when the lateral member is bridged between the first and the second arm portions after setting the cables on the bottom portion and then the lateral member is moved down relative to the main member, the cables are bound and fixed by the binding tool and the cables are prevented from being removed from the binding tool.

Specifically, in a state in which the first and the second engaging pieces are engaged with the first and the second sawtooth-like notch potions, respectively, even if an upward force is exerted to the cables (also to the lateral member), the first and the second engaging pieces are engaged with the first and the second sawtooth-like notch portions, respectively, and the lateral member is prevented from being removed from the main member. Therefore, the cables are prevented from being removed from the binding tool.

Subsequently, in a seventh aspect of the present invention, there are provided first and second operating protrusions for releasing the engagements of the first and the second engaging pieces with the first and the second sawtooth-like notch portions, respectively, on the positions near the first and the second engaging pieces, respectively.

According to the binding tool of the seventh aspect of the present invention, operation for releasing the cables from the binding tool after the cables are bound and fixed by the binding tool can be easily carried out.

In more detail, when the cables bound and fixed by the binding tool of the present invention are removed from the binding tool, it becomes possible for the cables to be removed by releasing the lateral member from the main member after the engagements of the first and the second engaging pieces with the first and the second sawtooth-like notch portions, respectively, are released by pinching with a hand of the operator and elastically deforming the positions of the lateral member near the first and the second engaging pieces.

And according to the binding tool of this type, since the first and the second operating protrusions are provided on the positions pinched with a hand of the operator, the operation for removing the bound and fixed cables can be easily carried out.

Subsequently, an eighth aspect of the present invention is provided on the upper end of the second arm portion with a rotation support engaging with an end of the lateral member at the second arm portion side, for preventing the lateral member from being separated from the second arm portion when the lateral member is rotated with the end as a rotation axis.

According to the binding tool of the eighth aspect of the present invention, when the end of the lateral member at the second arm portion side is positioned on the upper end of the second arm portion, the end of the lateral member is engaged with the rotation support. And the lateral member can be rotated with the end as a rotation axis by the engagement with the rotation support and prevented from being separated from the second arm portion. Therefore, the lateral member is prevented from being lost after the binding and fixing of the cables with the binding tool is released.

Specifically, at first, an end of the lateral member at the first arm portion side is released from the upper end of the first arm portion and the lateral member is rotated as described above so that a state in which the lateral bar is not bridged between the first and the second arm portions is realized and the cables set on the bottom portion can be removed from the binding tool. Moreover, since the lateral member is prevented from being separated from the second arm portion by the rotation support after the removal of cables, the main member and the lateral member can be kept together and the lateral member is prevented from being lost.

BRIEF DESCRIPTION OF THE DRAWINGS

A binding tool according to this invention will now be described, by way of example, with reference to the accompanying drawings, in which:

FIGS. 3A, 3B and 3C are a right side view, a rear view and a left side view of the main member, respectively, FIGS. 5A, 5B and 5C are a left side view, a front view and a right side view, respectively, of a lateral member which is a constituent of the binding tool of the embodiment, FIGS. 5D and 5E are sectional views of the lateral member taken along the line C—C and the line D—D, respectively, FIG. 7 is a plan view showing a form of a hole bored on a support for fixing the binding tool of the embodiment, and for using the binding tool of the embodiment.

DESCRIPTION OF THE INVENTION

Figure 1A:
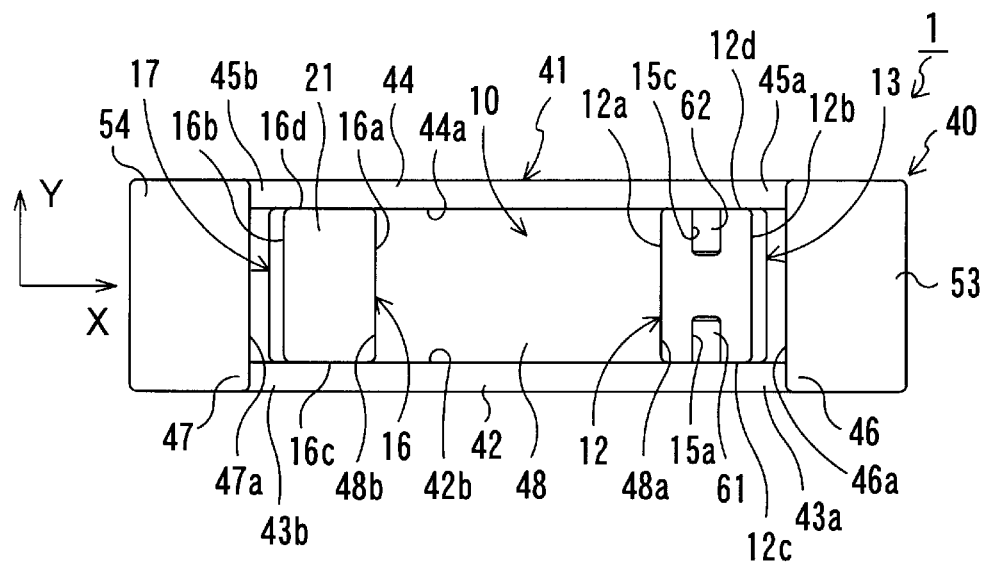
FIGS. 1A and 1B are a plan view and a front view, respectively, showing a total constitution of a binding tool of the embodiment.
Figure 1B:
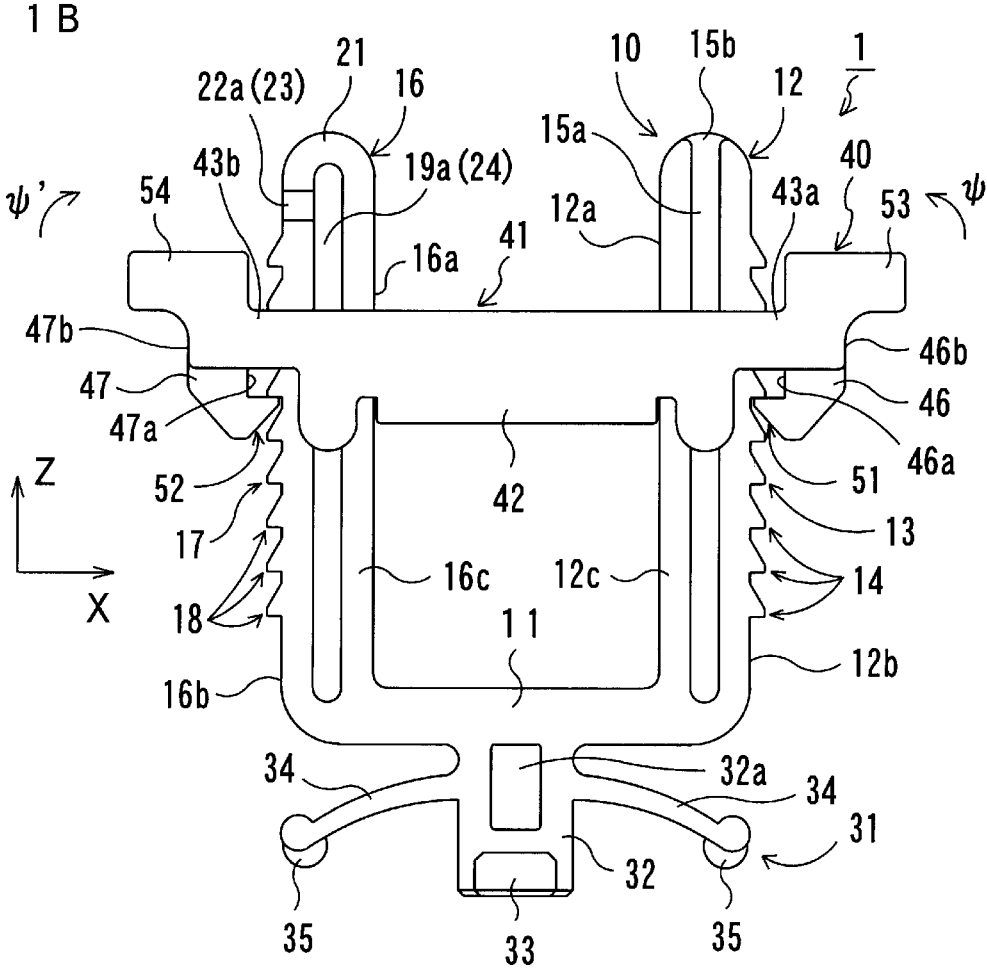

As shown in FIGS. 1A and 1B, a binding tool 1 of the present embodiment comprises a main member 10 provided on its lower end with a fixing part 31 for fixing the main member 10 to a support (not shown) such as a chassis and a panel, and a lateral member 40 engaged and fixed to the main member 10 at its left and right ends. The binding tool 1 is constituted such that a bundle of cables can be bound and fixed to the support when the bundle of the cable is cramped between a bottom portion 11 of the main member 10 described hereafter and a lateral bar 41 of the lateral member 40 described hereafter. The main member 10 and the lateral member 40 are integrally formed (for example, by injection molding) from a elastically deformable plastics (for example, polypropylene resin, nylon resin and the like).

At first the constitution of the binding tool 1 will be described referring to FIGS. 1A to 6C.

The main member 10 is constituted from a laterally (along X direction in the figures in the present embodiment) extending bottom portion 11. a first arm portion 12 and a second arm portion 16 extending upward (along Z direction in the figures) from two positions on the bottom portion 11 laterally spaced with a predetermined distance (a left end and a right end of the bottom portion 11 in the present embodiment), respectively. In the present embodiment, the length of the first arm portion 12 and the second arm portion 16 along the longitudinal direction is nearly the same.

On faces 12b and 16b opposite to faces 12a and 16a of the first arm portion 12 and the second arm portion 16 facing each other, respectively, a first sawtooth-like notch portion 13 and a second sawtooth-like notch portion 17 are provided, respectively.

The first sawtooth-like notch portion 13 and the second sawtooth-like notch portion 17 are constituted as parts on which teeth are formed continuously along the longitudinal direction, respectively. Teeth 14 forming the first sawtooth-like notch portion 13 are constituted such that a first engaging piece 51 mentioned hereafter of the lateral member 40 can be engaged between the two longitudinally continuing teeth 14 and teeth 18 forming the second sawtooth-like notch portion 17 are constituted such that a second engaging piece 52 mentioned hereafter of the lateral member 40 can be engaged between the two longitudinally continuing teeth 18.

And in the present embodiment, the teeth 14 and 18 constituting the sawtooth-like notch portions 13 and 17, respectively, are formed in nearly the same shape.

In more detail, firstly, the teeth 14 of the first sawtooth-like notch portion 13 are constituted so as to project from the right side face 12b of the first arm portion 12 to the right direction (X direction) and the tooth 14 has an upper face 14b and a lower face 14c with an edge 14a provided between them. Secondly, the teeth 18 of the second sawtooth-like notch portion 17 are constituted so as to project from the left side face 16b of the second arm portion 16 to the left direction (reverse to X direction) and the tooth 18 has an upper face 18b and a lower face 18c with an edge 18a provided between them.

Figure 2A:
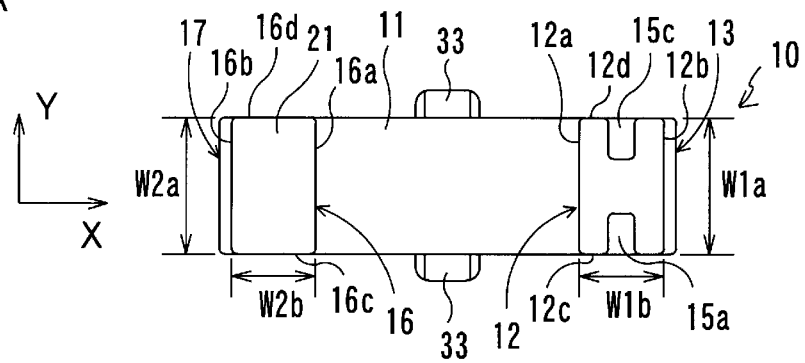
FIGS. 2A, 2B and 2C are a plan view, a front view and a bottom view, respectively, showing a form of a main member which is a constituent of the binding tool of the embodiment.
Figure 2B:
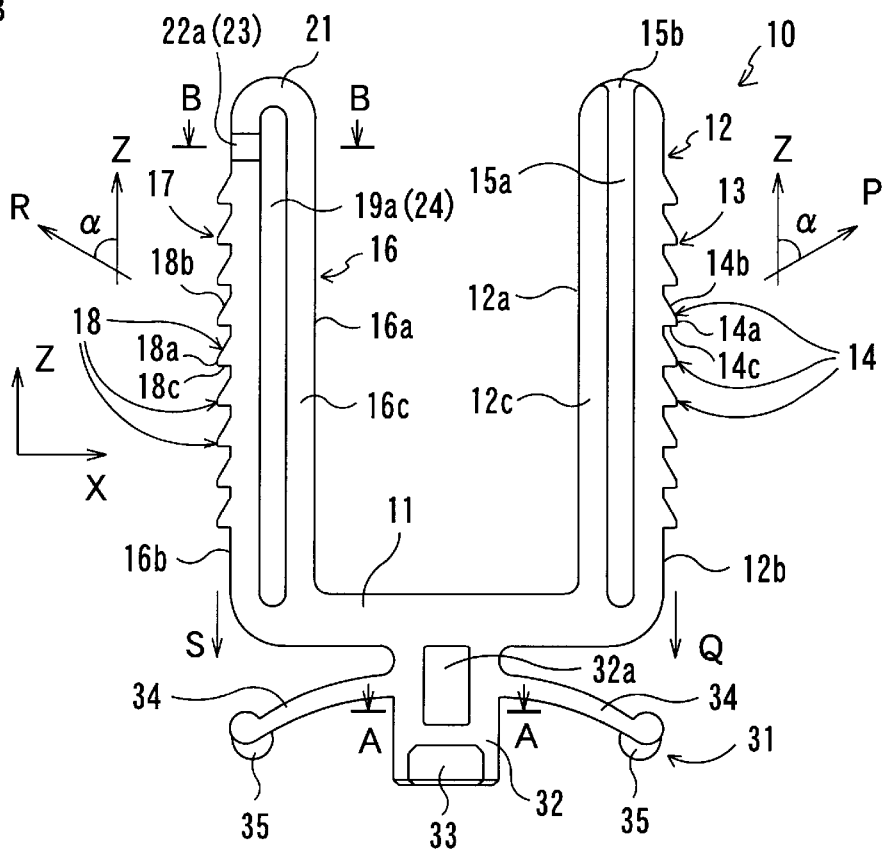
Figure 2C:
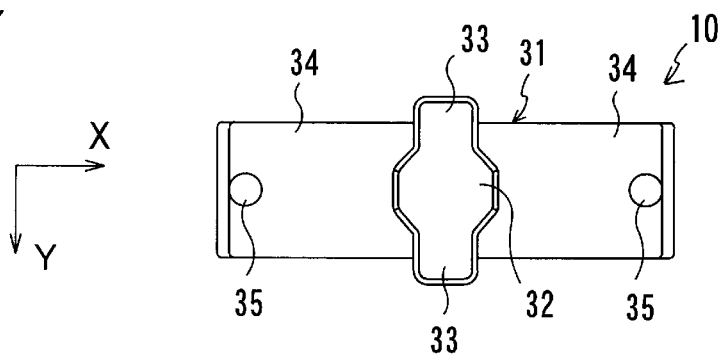

And as shown in FIG. 2B, the upper face 14b of the tooth 14 on the first sawtooth-like notch portion 13 and the upper face 18b of the tooth 18 on the second sawtooth-like notch portion 17 are in common in that the angles between the directions P and R of normal lines of the upper faces 14b and 18b, respectively, and the upward direction Z are both acute angles $\alpha$ (0°<$\alpha$<90°).

Moreover, the lower face 14c of the tooth 14 on the first sawtooth-like notch portion 13 and the lower face 18c of the tooth 18 on the second sawtooth-like notch portion 17 are in common in that the angles between the directions of Q and S of normal lines of the lower faces 14c and 18c, respectively, and the upward direction Z are both nearly 180°.

Furthermore, the edge 14a of the tooth 14 on the first sawtooth-like notch portion 13 and the edge 18a of the tooth 18 on the second sawtooth-like notch portion 17 are both linear edges extending in the transverse direction (along Y direction in the figures) and chamfered.

In the present embodiment, since the first sawtooth-like notch portion 13 engaged with the first engaging piece 51 is provided on the right side face 12b of the first arm portion 12 and the second sawtooth-like notch portion 17 engaged with the second engaging piece 52 is provided on the left side face 16b of the second arm portion 16, the lateral width of the total main member 10 can be lessened compared with the case in which, for example, the first sawtooth-like notch portion 13 is provided on a front face 12c of the first arm portion 12 and the second sawtooth-like notch portion 17 is provided on a front face 16c of the second arm portion 16.

Specifically, as shown in FIG. 2A, the width W1a of the right side face 12b provided with the first sawtooth-like notch portion 13 of the first arm portion 12 (that is, the width of the first arm 12 in the transverse direction) and the width W2a of a left side face 16b provided with the second sawtooth-like notch portion 17 of the second arm portion 16 (that is, the width of the second arm portion 16 in the transverse direction) should be relatively large in order to achieve sure engagements of the first engaging piece 51 and the second engaging piece 52 with the first sawtooth-like notch portion 13 and the second sawtooth-like notch portion 17, respectively. However, the lateral width W1b of the first arm 12 and the lateral width W2b of the second arm 16 may be narrowed within the limit in which there is no problem concerning material strength, since the first sawtooth-like notch portion 13 and the second sawtooth-like notch portion 17 are not provided on the side face 12c and 16c.

As a result, in the present embodiment, the lateral width of the whole main member 10 can be lessened by forming W1b smaller than W1a and W2b smaller than W2a within the limit in which there is no problem concerning the material strength.

A first guide groove 15a and a second guide groove 15c, both of which are extending longitudinally, are provided on the front face 12c and the rear face 12d of the first arm portion 12, respectively.

Both of the first guide groove 16a and the second guide groove 15c are extending from the upper end of the first arm portion 12 to a part near the lower end of the first arm portion 12. The upper ends of the guide grooves 15a and 15c are open ends 15b and 15d opened upward, respectively. A first engaging protrusion 61 and a second engaging protrusion 62 on the lateral member 40 are designed to be inserted into the first guide groove 15a and the second guide groove 15c via the open edges 15b and 15d, respectively, as mentioned hereafter.

Furthermore, a first inserting groove 19a and a second inserting groove 19b, both of which are extending longitudinally, are provided on the front face 16c and a rear face 16d of the second arm portion 16, respectively.

Both of the first inserting groove 19a and the second inserting groove 19b are extending from a part near the upper end of the second arm portion 16 to a part near the lower end of the second arm portion 16. The upper ends of the first inserting groove 19a and the second inserting groove 19b are surrounded by a semi-circular flange 21 as a rotation support of the present invention and are not opened upward. More specifically, in the present embodiment, the upper ends of the first inserting groove 19a and the second inserting groove 19b are designed not to be opened upward by making the width of the semi-circular flange 21 along the transverse direction the same as the width W2a of the second arm portion 16 along the transverse direction (refer to FIG. 3C).

Moreover, a first flange recess 22a and a second flange recess 22b connected to the first inserting groove 19a and the second inserting groove 19b, respectively, are provided on parts near the upper end of the left side face 16b of the second arm portion 16. A first protrusion 63 and a second protrusion 64 on the lateral member 40 are designed to be inserted into the first inserting groove 19a and the second inserting groove 19b via the first flange recess 22a and the second flange recess 22b, respectively.

Figure 4A:
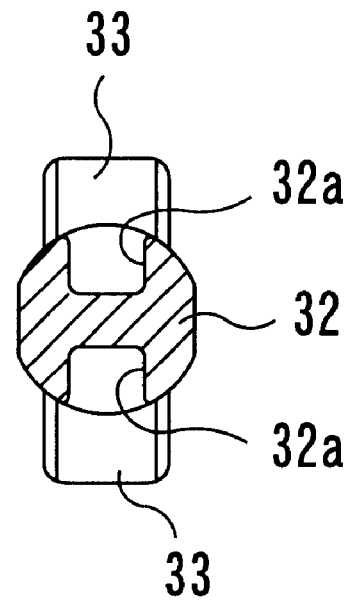
FIGS. 4A and 4B are sectional views of the main member of FIG. 2B taken along the line A—A and the line B—B, respectively.
Figure 4B:
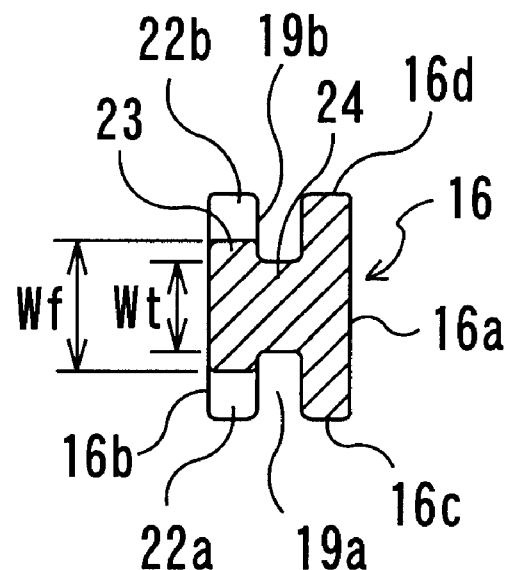
Figure 6A:
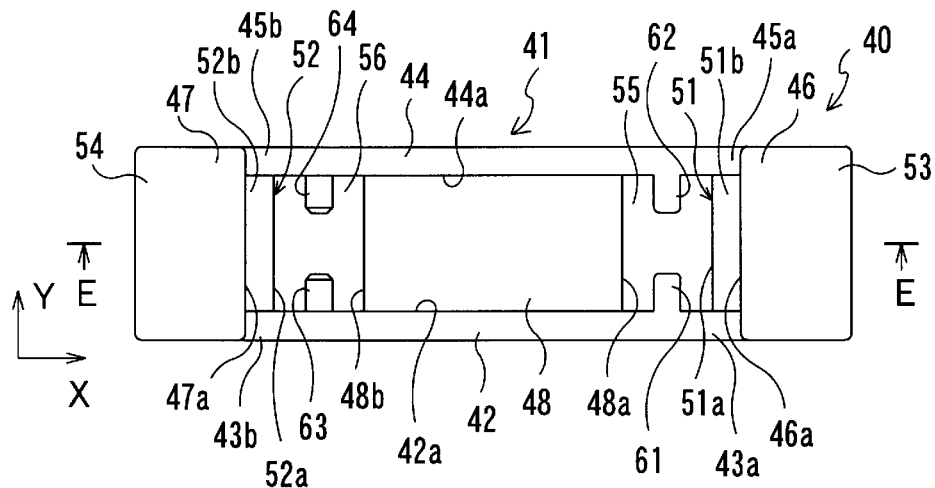
FIGS. 6A and 6B are a plan view and a bottom view of the lateral member, respectively.
Figure 6B:
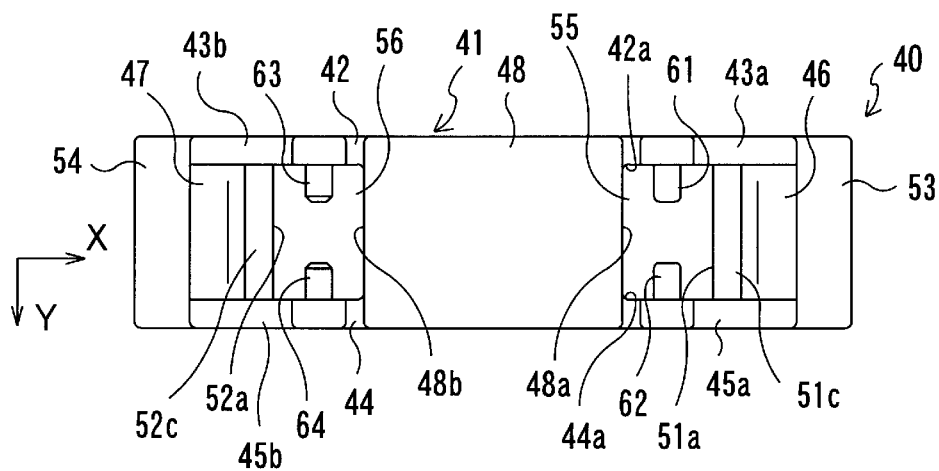
Figure 6C:
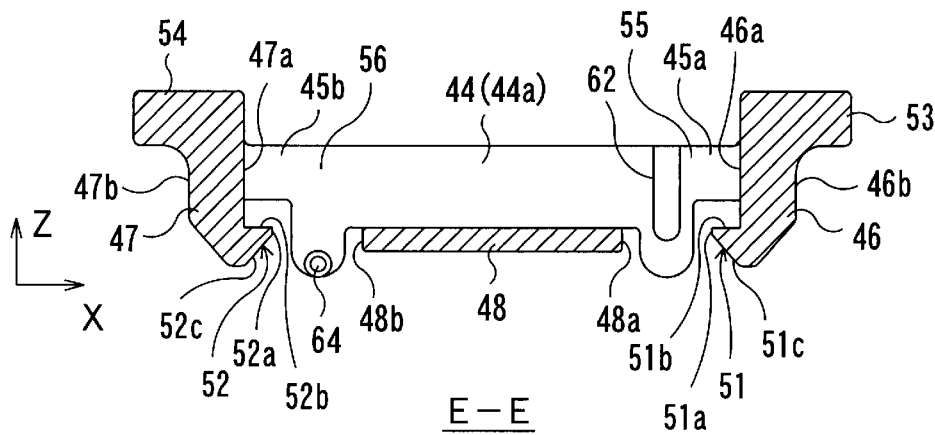
FIG. 6C is a sectional view of the lateral member taken along the line E—E.

In the present embodiment, as shown in FIG. 4b, the width Wf of a thin flange 23 of the second arm portion 16, which is made thin because the first flange recess 22a and the second flange recess 22b are provided on the thin flange 23 itself, is designed to be larger than the width Wt of a thin board 24 of the second arm portion 16, which is made thin because the first inserting groove 19a and the second inserting groove 19b are provided on the thin board 24 itself.

On the other hand, a fixing part 31 of the main member 10 is provided near the center of the lower end of the bottom portion 11 and designed to be fixed to the support by being engaged with a fixing hole 81 and two engaging holes 83 (see FIG. 7). The fixing hole 81 is constituted by a circular hole 81a bored through the board and a pair of rectangular holes 81b bored on both sides of the circular hole 81a to be connected to each other through the circular hole 81a. The two engaging holes 83 are through holes both smaller than the circular hole 81a in the diameter. One of the engaging holes 83 is formed on a position opposite to the position of the circular hole 81a relative to the position of one of the rectangular holes 81b, and the other engaging hole 83 is formed on a position opposite to the position of the circular hole 81a relative to the other rectangular hole 81b.

The fixing part 31 comprises a foot portion 32 which projects downward from the lower end of the bottom portion 11 and is constituted to be inserted rotatably into the circular hole 81a, a pair of engaging protrusions 33 provided on the front and rear parts of the lower end of the foot portion 32 and a pair of press wings 34 provided on the left and right parts near the upper end of the foot portion 32, and a protrusion 35 corresponding to each engaging hole 83 is provided on the lower side of the end part of each press wing 34. A recess 32a is made on each of the front side and rear side of the foot portion 32 (see FIG. 4A).

On the other hand, the lateral member 40 has the lateral bar 41, which comprises a first side 42 laterally extending, a second side 44 extending laterally disposed behind the first side 42 spaced with a predetermined distance, a first connecting piece 46 connecting the right end of the first side 42 and the right end of the second side 44, a second connecting piece 47 connecting the left end of the first side 42 and the left end of the second side 44, and a central connecting piece 48 connecting the center of the lower end part of the first side 42 and the center of the lower end part of the second side 44.

There is a predetermined space between the left face 46a of the first connecting piece 46 provided on the right end of the lateral bar 41 and the right face 48a of the central connecting piece 48 provided on the center of the lower end part of the lateral bar 41 There is also a predetermined space between the right face 47a of the second connecting piece 47 provided on the left end of the lateral bar 41 and the left face 48b of the central connecting piece 48.

In the present embodiment, a region surrounded by the left face 46a of the first connecting piece 46, the right face 48a of the central connecting piece 48, a position near the first connection piece 46 on a rear face 42a of the first side 42 facing the second side 44 and a position near the first connection piece 46 on a front face 44a of the second side 44 facing the first side 42 forms a first insertion hole 65 which is longitudinally bored through the lateral bar 41 as an insertion hole of the present invention.

And a region surrounded by a right face 47a of the second connecting piece 47, a left face 48b of the central connecting piece 48, a position near the second connecting piece 47 on the rear face 42a of the first side 42 and a position near the second connecting piece 47 on the front face 44a of the second side 44 forms a second insertion hole 56 which is longitudinally bored through the lateral bar 41.

The first insertion hole 65 and the second insertion hole 56 are constituted to be inserted by the first arm portion 12 and the second arm portion 16, respectively, when the lateral bar 41 is bridged between the first arm portion 12 and the second arm portion 16.

And a first engaging protrusion 61 and the second engaging protrusion 62 are provided on positions on the inner face of the first insertion hole 55 corresponding to the first guide groove 15a and the second guide groove 15c, respectively.

Both of the first engaging protrusion 61 and the second engaging protrusion 62 extend longitudinally. The first engaging protrusion 61 is provided on the rear face 42a of the first side 42 and constituted in such a way that it is inserted into the first guide groove 15a slidably in the longitudinal direction and the left and right faces of the first engaging protrusion 61 are guided in the first guide groove 15a when the lateral bar 41 is bridged between the first arm portion 12 and the second arm portion 16 (that is, when the first arm portion 12 is inserted into the first insertion hole 55).

The second engaging protrusion 62 is provided on the front face 44a of the second side 44 facing the first engaging piece 61 and constituted in such a way that it is inserted into the second guide groove 15c slidably in the longitudinal direction and the left and right faces of the second engaging protrusion 62 are guided in the second guide groove 15c when the lateral bar 41 is bridged between the first arm portion 12 and the second arm portion 16.

A first protrusion 63 and a second protrusion 64 are provided on positions of the inner face of the second insertion hole 56 corresponding to the first inserting groove 19a and the second inserting groove 19b, respectively.

The first protrusion 63 and the second protrusion 64 are both cylindrical protrusions.

The first protrusion 63 is provided on a position near the lower end on the rear face 42a of the first side 42 and constituted to be inserted into the first inserting groove 19a slidably in the longitudinal direction when the lateral bar 41 is bridged between the first arm portion 12 and the second arm portion 16 (that is, when the second arm portion 16 is inserted into the second insertion hole 56).

The second protrusion 64 is provided on a position near the lower end on the front face 44a of the second side 44 and faces to the first protrusion 63. The second protrusion 64 is constituted to be inserted into the second inserting groove 19b slidably in the longitudinal direction when the lateral bar 41 is bridged between the first arm portion 12 and the second arm portion 16.

The distance Wp between the tip end of first protrusion 63 and the tip end of the second protrusion 64 is designed to be $Wt<Wp<Wf$ (refer to FIGS. 4B and 5D).

On the other hand, a first engaging piece 51 projecting in the left direction is provided on the lower end of a left face 46a of the first connecting piece. 46 and a second engaging piece 52 projecting in the right direction is provided on the lower end of the right face 47a of the second connecting piece 47.

The first engaging piece 51 and the second engaging piece 52 are constituted to be engaged with the first sawtooth-like notch portion 13 of the first arm portion 12 and the second sawtooth-like notch portion 17 of the second arm portion 16, respectively, when the lateral bar 41 is bridged between the first arm portion 12 and the second arm portion 16.

In the present embodiment, the shapes of the first engaging piece 51 and the second engaging piece 52 are made nearly the same.

Specifically, the first engaging piece 51 has an upper face 51b above and a lower face 51c below a tip end 51a at the left side, and the second engaging piece 52 has an upper face 52b above and a lower face 52c below a tip end 52a at the right side.

As shown in FIG. 5B, the upper face 51b of the first engaging piece 51 and the upper face 52b of the second engaging piece 52 are in common in that the angles between the directions T and U of normal lines of the upper faces 51b and 52b, respectively, and the upward direction Z are both nearly zero.

Furthermore, the lower face 51c of the first engaging piece 51 and the lower face 52c of the second engaging piece 52 are in common in that the angles between the directions V and W of normal lines of the lower faces 51c and 52c, respectively, and the upward direction Z are both an obtuse angle $\beta$ ($90° < \beta < 180°$).

Moreover, the tip end 51a of the first engaging piece 51 and the tip end 52a of the second engaging piece 52 are both linear tip portions extending in the transverse direction. Each edge is chamfered (refer to FIGS. 5D and 5E).

On the other hand, a first operating protrusion 53 projecting in the right direction is provided on the upper end of the right face 46b of the first connection piece 46 and a second operating protrusion 54 projecting in the left direction is provided on the upper end of the left face 47b of the second connection piece 47.

In the present embodiment, the thickness of the first side 42 along the transverse direction and the thickness of the second side 44 along the transverse direction (i.e. along Y direction) are designed to be nearly the same. The longitudinal (i.e. along the upward direction Z) board thickness of the right end 43a of the first side 42 and the right end 45a of the second side 44 which are parts near the first connecting piece 46 and the longitudinal board thickness of the left end 43b of the first side 42 and the left end 45b of the second side 44 which are near the second connecting piece 47 are designed to be smaller than the longitudinal board thickness of the other part of each board.

In the following, an example of a use of a thus constituted binding tool 1 will be described referring to FIGS. 1A, 1B, 8 and 9.

Firstly, the lateral member 40 is mounted on the main member 10.

Specifically, the first protrusion 63 and the second protrusion 64 of the lateral member 40 are passed to the first flange recess 22a and the second flange recess 22b, respectively, of the second arm portion 16 to be inserted into the first inserting groove 19a and the second inserting groove 19b, respectively.

Since the distance Wp between the tip end of the first protrusion 63 and the tip end of the second protrusion 64 is designed to be Wt<Wp<Wf, it is necessary that the lateral member 40 is elastically deformed with a force applied to the lateral member 40 so that the distance Wp is widened, in order to pass the first protrusion 63 and the second protrusion 64 through the first flange recess 22a and the second flange recess 22b, respectively. However, once the first protrusion 63 and the second protrusion 64 have been inserted into the first inserting groove 19a and the second inserting groove 19b, respectively, it is difficult to remove the first protrusion 63 and the second protrusion 64 through the first flange recess 22a and the second flange recess 22b, respectively, and so the first protrusion 63 and the second protrusion 64 are stably held in the first inserting groove 19a and the second inserting groove 19b, respectively.

Figure 8:
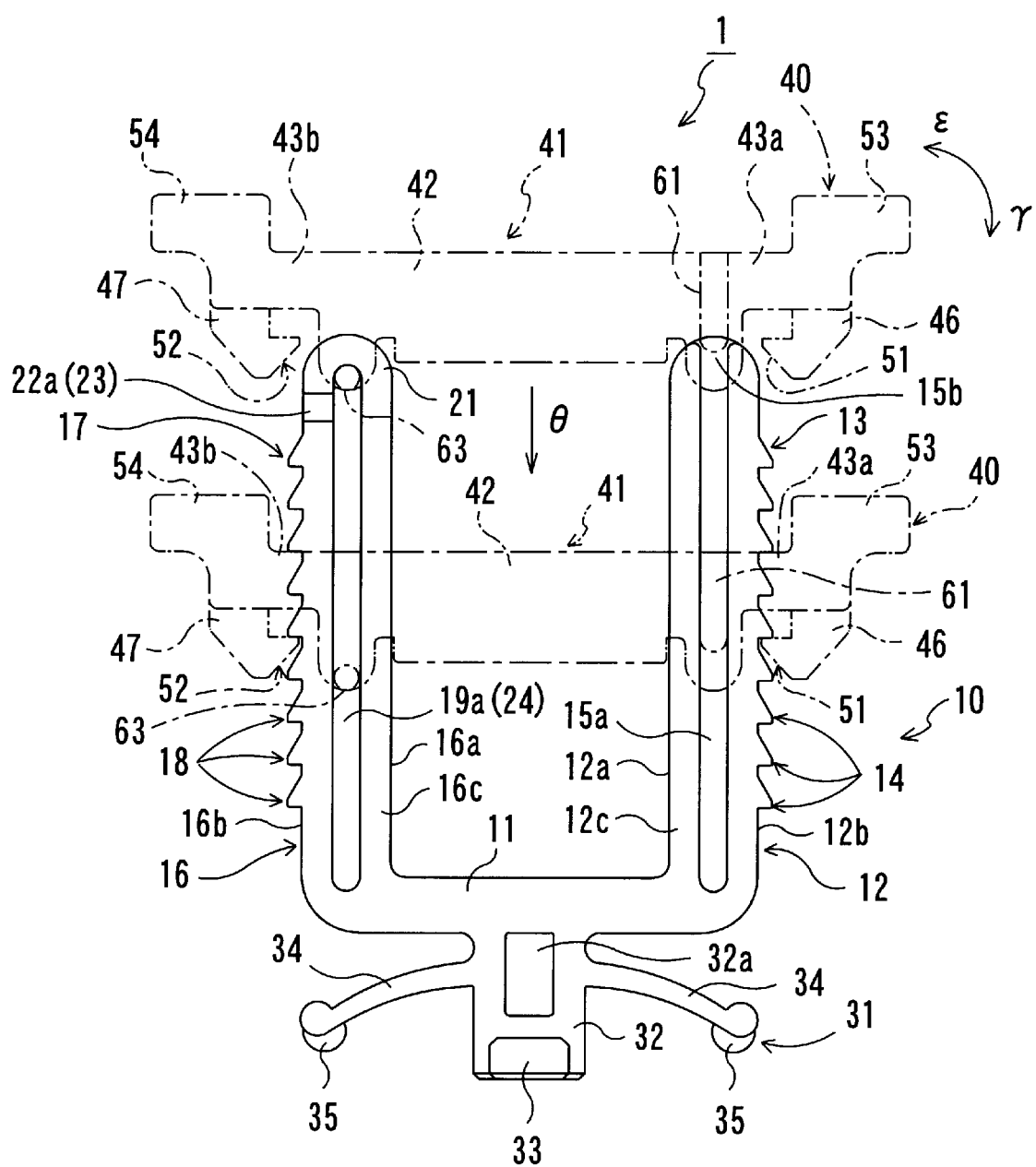
FIGS. 8 and 9 are explanatory figures for explaining a method for using the binding tool of the embodiment.

Moreover, since the upper ends of the first inserting groove 19a and the second inserting groove 19b are not opened upward but surrounded by the semi-circular flange 21, the first protrusion 63 and the second protrusion 64 are engaged with the semi-circular flange 21 when the first protrusion 63 and the second protrusion 64 which are on one end of the lateral member 40 at the second arm 16 side are disposed at the upper end of the second arm 16, as shown in FIG. 8.

In this state, the lateral member 40 can be rotated relative to the main member 10 in the direction of $\epsilon$ or $\gamma$ around the first protrusion 63 and the second protrusion 64 as a rotation axis. The semi-circular flange 21 can certainly prevent the lateral member 40 from being disengaged from the second arm portion 16 (or removed from the upper end of the second arm portion 16) when the lateral member 40 is shifted upward along the second arm portion 16.

In FIG. 8, in order to show the positional relationship between the first protrusion 63 and the first inserting groove 19a and positional relationship between the first engaging protrusion 61 and the first guide groove 15a, the lateral member 40 including the first protrusion 63 and the first engaging protrusion 61 is shown in dotted chain lines when it is positioned on the upper end of the main member 10 and when it is pushed down relative to the main member 10, respectively.

Subsequently, the main member 10 mounted with the lateral member 40 in such a way is fixed to the support.

In more detail, at first, the engaging projection 33 is passed through the rectangular hole 81b to make the foot portion 32 be inserted into the circular hole 81a. Specifically, since the shape of the engaging projection 33 seen from the bottom or from the top is nearly rectangular corresponding to the rectangular hole 81b (see FIG. 2C), the foot portion 32 can be inserted into the circular hole 81a when the engaging projection 33 is passed through the rectangular hole 81b.

Then, the press wings 34 are made to abut the board and elastically deformed to make the engaging projection 33 be positioned on the back side of the board by inserting the foot portion 32 into the circular hole 81a more deeply than a predetermined length.

Subsequently, the fixation of the fixing part 31 to the board is completed when the foot portion 32 is rotated in the circular hole 81a to make the engaging projection 33 be pressed to the back side of the board by the elastic force exerted from the press wings 34 and to make the two protrusions 35 engage with the two engaging holes 83, respectively. Specifically, the fixing part 31 is immovably fixed to the board by pinching the board between the engaging projection 33 and the press wing 34 and preventing rotation of the foot portion 32 in the circular hole 81a by engagement of the protrusions 35 with the engaging holes 83.

Subsequently, the bundle of cables are bound and fixed to the binding tool 1 fixed to the support in such a way.

At first, the lateral member 40 is rotated beforehand in the direction of ε relative to the main member 10 so that one end of the lateral member 40 at the first arm portion 12 side is kept apart from the first arm portion 12, and then the bundle of cables 91 (refer to FIG. 9) are disposed on the bottom portion 11.

Subsequently, the lateral member 40 is rotated in the direction of γ relative to the main member 10 so that the lateral bar 41 is bridged between the first arm portion 12 and the second arm portion 16.

More specifically, the first engaging protrusion 61 and the second engaging protrusion 62 on the lateral member 40 are inserted into the first guide groove 15a and the second guide groove 15c of the first arm portion 12 from the open ends 15b and 15d, respectively, so that the first arm portion 12 and the second arm portion 16 are inserted into the first insertion hole 55 and the second insertion hole 56 on the lateral member 40, respectively.

Then, the binding and fixing of the bundle of cables is completed when the lateral member 40 is pushed down relative to the main member 10 (by being moved in the direction of θ shown in FIG. 8) so that the bundle of cables 91 are pinched between the bottom portion 11 and the lateral bar 41 (the figure of the bundle of the cables 91 is omitted in FIG. 8).

Specifically, the angle between the normal line P of the upper face 14b on the tooth 14 of the first sawtooth-like notch portion 13 and the upward direction Z and the angle between the normal line R of the upper face 18b on the tooth 18 of the second sawtooth-like notch portion 17 and the upward direction Z are both an acute angle α. The angle between the normal line V of the lower face 51c on the first engaging piece 51 and the upward direction Z and the angle between the normal line W of the lower ace 52c on the second engaging piece 52 and the upward direction Z are both an obtuse angle β. Therefore, when the lateral member 40 is moved downward relative to the main member 10, the first engaging piece 51 and the second engaging piece 52 of the lateral member 40 can be moved along the first sawtooth-like notch portion 13 of the first arm portion 12 and the second sawtooth-like notch portion 17 of the second arm portion 16, respectively, accompanied by elastic deformation of the lateral bar 41.

And when the first engaging piece 51 and the second engaging piece 52 are engaged with the first sawtooth-like notch portion 13 and the second sawtooth-like notch portion 17, respectively, in suitable positions so that the bundle of the cables 91 are pinched between the bottom portion 11 and the lateral bar 41, the bundle of cables 91 are bound and fixed to the board.

Therefore, according to the binding tool 1 of the present embodiment, even then the thickness and number of the cable consisting the bundle of the cables 91 to be bound and fixed are changed, binding and fixing of such a bundle of cables 91 can be surely carried out by changing the engaging positions of the first engaging piece 51 and the second engaging piece 52 with the first sawtooth-like notch portion 13 and the second sawtooth-like notch portion 17, respectively, to adjust the distance between the bottom potion 11 and the lateral bar 41.

In the present embodiment, since the first arm portion 12 and the second arm portion 16 are inserted into the first insertion hole 55 and the second insertion hole 56, respectively, when the lateral bar is bridged between the first arm portion 12 and the second arm portion 16, the lateral member 40 is stably held by the main member 10 and the lateral member 40 becomes less removable.

Moreover, in the present embodiment, since the first engaging piece 51 and the second engaging piece 52 can be moved on the first sawtooth-like notch portion 13 and the second sawtooth-like notch portion 17, respectively, with elastic deformation of the lateral bar 41 when the lateral member 40 is pushed down relative to the main member 10, operation for moving the lateral member 40 downward on the main member 10 can be done with only one hand of the operator.

Furthermore, in the present embodiment, when the lateral member 40 is pushed down relative to the main member 10, the first engaging protrusion 61 and the second engaging protrusion 62 are moved downward in the first guide groove 15a and the second guide groove 15c, respectively, and the first protrusion 63 and the second protrusion 64 are moved downward in the first inserting groove 19a and the second inserting groove 19b, respectively.

Here, since the first engaging protrusion 61 and the second engaging protrusion 62 are provided on the inner face of the first insertion hole 55, the engagements of the first engaging protrusion 61 and the second engaging protrusion 62 with the first guide groove 15a and the second guide groove 15c, respectively, are not released, once the lateral bar 41 is bridged between the first arm portion 12 and the second arm portion 16.

Also, since the first protrusion 63 and the second protrusion 64 are provided on the inner face of the second insertion hole 56, the engagements of the first protrusion 63 and the second protrusion 64 with the first insertion hole 19a and the second insertion hole 19b, respectively, are not released, once the lateral bar 41 is bridged between the first arm portion 12 and the second arm portion 16.

Since the first engaging protrusion 61 and the second engaging protrusion 62 both extend longitudinally and left and right faces of the first engaging protrusion 61 and those of the second engaging protrusion 62 are guided in the first guide groove 15a and the second guide groove 15c, respectively, when the lateral bar 41 is bridged between the first arm portion 12 and the second arm portion 16 and when the lateral member 40 is pushed down, the lateral bar 41 is prevented from being slanted relative to the lateral direction.

Therefore, according to the binding tool 1 of the present embodiment, the left and right ends of the lateral member 40 can be uniformly pushed down after the lateral bar 41 is bridged between the first arm portion 12 and the second arm portion 16.

Furthermore, as a result, when pushed down relative to the main member 10, the lateral member 40 is prevented from being caught on the main member 10 (that is, a state, in which a frictional force exerted between the first engaging piece 51 and the first sawtooth-like notch portion 13 or a frictional force exerted between the second engaging piece 52 and the second sawtooth-like notch portion 17 becomes too big to be operated by the strength of operator's hand, is prevented from happening) and so the lateral member 40 can be pushed down relative to the main member 10 to a desired position. The bundle of cables 91 are bound and fixed with a sufficient force since the engagements of the first engaging piece 51 and the second engaging piece 52 with the first sawtooth-like notch portion 13 and the second sawtooth-like notch portion 17, respectively, are stabilized.

On the other hand, according to the binding tool 1 of the present embodiment, even when an upward force is exerted to the bundle of cables 91, the bundle of cables 91 are prevented from being removed from the binding tool 1, once the bundle of cables 91 have been bound and fixed in the manner described above.

In more detail, the angle between the normal line Q of the lower face 14c on the tooth 14 of the first sawtooth-like notch portion 13 and the upward direction Z and the angle between the normal line S of the lower face 18c on the tooth 18 of the second sawtooth-like notch portion 17 and the upward direction Z are both nearly 180° and the angle between the normal line T of the upper face 51b on the first engaging piece 51 and the upward direction Z and the angle between the normal line U of the upper face 52b on the second engaging piece 52 and the upward direction Z are both nearly 0°. Therefore, when the first engaging piece 51 and the second engaging piece 52 are engaged with the first sawtooth-like notch portion 13 and the second sawtooth-like notch portion 17, respectively, the lateral member 40 is prevented from being removed from the main member 10, even if an upward force is exerted to the bundle of cables 91 (and also to the lateral member 40). Thereby, the bundle of cables 91 are prevented from being removed from the binding tool 1.

In the present embodiment, the first sawtooth-like notch portion 13 and the second sawtooth-like notch portion 17 are provided respectively on the faces 12b and 16b opposite to the face 12a of the first arm portion 12 and the face 16a of the second arm portion 16 which are facing to each other. The first engaging piece 51 and the second engaging piece 52 of the lateral member 40 are designed to be disposed on positions corresponding to the first sawtooth-like notch portion 13 and the second sawtooth-like notch portion 17, respectively, when the lateral bar 41 is bridged between the first arm portion 12 and the second arm portion 16.

Figure 9:
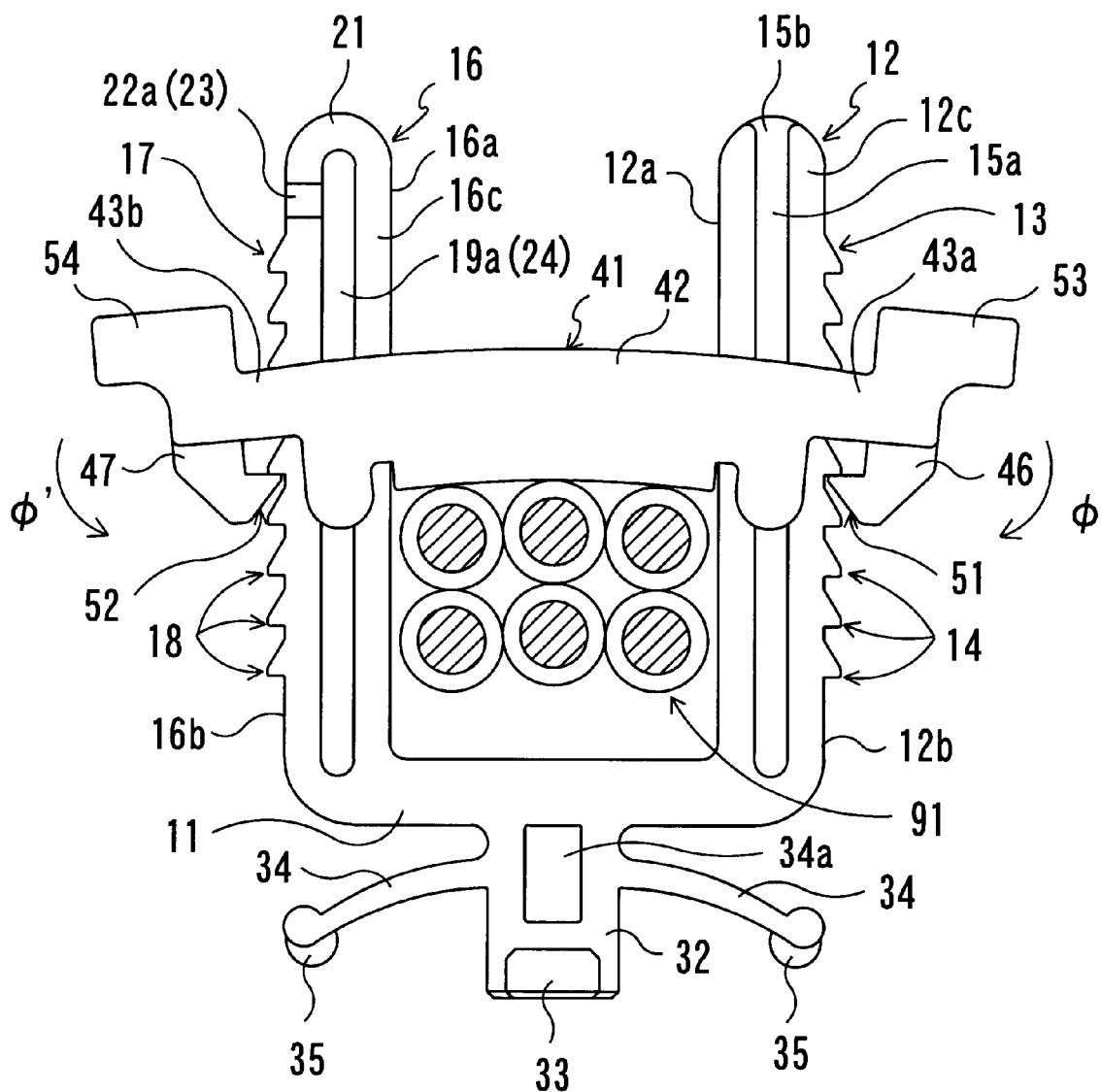

Therefore, when the upward force is exerted to the bundle of cables 91 after the bundle of cables 91 are bound and fixed to the binding tool 1, the right end of the lateral member 40 is rotated in the direction of φ and the left end of the lateral member 40 is rotated in the direction of φ' as a result that the lateral member 40 is bent by the bundle of cables 91, as shown in FIG. 9. Consequently, the first engaging piece 51 and the second engaging piece 52 are more forcefully engaged to the first sawtooth-like notch portion 13 and the second sawtooth-like notch portion 17, respectively, and the bundle of cables 91 are surely prevented from being removed from the binding tool 1.

On the other hand, when the bundle of cables 91 are to be removed from the binding tool 1 after the bundle of cables 91 are thus bound and fixed to the binding tool 1, following operations may be carried out:

At first, the first operating protrusion 53 and the second operating protrusion 54 are pinched and bent in the directions of ψ and ψ' (refer to FIG. 1B), respectively, and the engagements of the first engaging piece 51 and the second engaging piece 52 with the first sawtooth-like notch portion 13 and the second sawtooth-like notch portion 17, respectively, are released.

Subsequently, the lateral member 40 is moved upward relative to the main member 10 to engage the first protrusion 63 and the second protrusion 64 with the semi-circular flange 21, and the first engaging protrusion 61 and the second engaging protrusion 62 are pulled out from the first guide groove 15a and the second guide groove 15c, respectively.

Then, the bundle of cables 91 disposed on the bottom portion 11 can be removed from the binding tool 1 when the lateral member 40 is rotated in the direction of ε relative to the main member 10 around the first protrusion 63 and the second protrusion 64 as a rotation axis so that the lateral bar 41 is not bridged between the first arm portion 12 and the second arm portion 16.

In the present embodiment, since the first operating protrusion 53 and the second operating protrusion 54 are provided near the first engaging piece 51 and the second engaging piece 52, respectively, of the lateral member 40, the release operation of the engagement of the first engaging piece 51 and the second engaging piece 52 can be easily carried out by pinching the first operating protrusion 53 and the second operating protrusion 54.

Moreover, in the present embodiment, the longitudinal thickness of the first side 42 at the right end 43a and left end 43b of the first side 42 is designed to be smaller than that at the other part of the first side 42 and the longitudinal thickness of the second side 44 at the right end 45a and left end 45b of the second side 44 is also designed to be smaller than that at the other part of the second side 44.

Therefore, on releasing the engagement of the first engaging piece 51 and the second engaging piece 52, the right end 43a of the first side 42 and the right end 45a of the second side 44 which are located near the first engaging piece 51 of the lateral bar 41 are easily bent and the engagement of the first engaging piece 51 is surely released. At the same time, the left end 43b of the first side 42 and the left end 45b of the second side 44 which are located near the second engaging piece 52 of the lateral bar 41 are easily bent and the engagement of the second engaging piece 52 is surely released.

Furthermore, when the lateral member 40 is moved upward relative to the main member 10 after the engagements of the first engaging piece 51 and the second engaging piece 52 are released, since similarly to the downward movement of the lateral member 40, left and right faces of the first engaging protrusion 61 and left and right faces of the second engaging protrusion 62 are guided in the first guide groove 15a and the second guide groove 15c, respectively, operation for moving the lateral member 40 can be easily carried out without upward and downward tilting of the lateral bar 41 to the lateral direction.

When the first protrusion 63 and the second protrusion 64 are kept engaged with the first inserting groove 19a and the second inserting groove 19b, respectively after the bundle of cables 91 are removed from the binding tool 1, the lateral member 40 is prevented from falling off from the second arm 16 owing to the semi-circular flange 21 and so on. Therefore, the main member 10 and the lateral member 40 can be kept unseparated, thereby the lateral member 40 being prevented from being lost.

In the above, one embodiment of the present invention was described. But the present invention is not limited to the above-mentioned embodiment and can be embodied in various ways.

For example, in the above-mentioned embodiment, the first engaging protrusion 61 is provided on the inner face of the first insertion hole 55 of the lateral member 40 and the first guide groove 15a is provided on the front face 12c of the first arm portion 12. But a first engaging protrusion with the same length as the longitudinal length of the first guide groove 15a of the present embodiment may be provided on the front face 12c of the first arm portion 12 in the main member 10 and a first guide groove extending from the upper end to the lower end of the inner face of the first insertion hole 55 may be provided on a position corresponding to the first engaging protrusion on the inner face of the first insertion hole 55.

Moreover, the second engaging protrusion 62 and the second guide groove 15c are not limited to those in the above-mentioned embodiment. A second engaging protrusion with the same length as the longitudinal length of the second guide groove 15c of the present embodiment may be provided on the rear face 12d of the first arm portion 12 and a second guide groove extending from the upper end to the lower end of the inner face of the first insertion hole 55 may be provided on a position corresponding to the second engaging protrusion on the inner face of the first insertion hole 55.

Additionally, each tooth of the teeth 14 (18) can be positioned at irregular intervals as long as they are disposed along the longitudinal direction.

What is claimed is:

1. A cable binding mechanism comprising:
   a main member having a bottom portion extending laterally;
   a spaced apart first arm portion and second arm portion respectively extending upward from two laterally opposed positions on the bottom portion;
   a first notch portion and a second notch portion provided on the first arm portion and the second arm portion, respectively;
   a lateral member having a lateral bar extending between the first arm portion and the second arm portion for clamping the cable with a bottom portion of the main member;
   a first engaging piece and a second engaging piece respectively disposed on both lateral ends of the lateral bar for engaging with the first notch portion and the second notch portion, respectively,
   to bind and fix the cable with the main member and the lateral member, wherein
   at least on one of the main member and the lateral member, there is provided a slant preventing portion for preventing the lateral bar from being slanted off from the lateral direction with respect to the bottom portion, when the lateral bar extends between the first arm portion and the second arm portion and when the lateral member is moved upward or downward.

2. The cable binding mechanism according to claim 1, wherein the first notch portion and the second notch portion comprise sawtooth-like and longitudinally continuing notched portions.

3. A cable binding mechanism comprising:
   a main member having a bottom portion extending laterally;
   a spaced apart first arm portion and second arm portion respectively extending upward from two laterally opposed positions on the bottom portion;
   a first notch portion and a second notch portion provided on the first arm portion and the second arm portion, respectively;
   a lateral member having a lateral bar extending between the first arm portion and the second arm portion for clamping the cable with a bottom portion of the main member;
   a first engaging piece and a second engaging piece respectively disposed on both lateral ends of the lateral bar for engaging with the first notch portion and the second notch portion, respectively,
   to bind and fix the cable with the main member and the lateral member, wherein
   at least on one of the main member and the lateral member, there is provided a slant preventing portion for preventing the lateral bar from being slanted off from the lateral direction with respect to the bottom portion, when the lateral bar extends between the first arm portion and the second arm portion, and
   wherein the slant preventing portion comprises
      a first engaging protrusion extending longitudinally on one of the first arm portion and the lateral member; and
      a first guide groove provided on the other of the first arm portion and the lateral member, such that the first engaging protrusion can be longitudinally slidably engaged with the groove, and the first engaging protrusion is guided in the groove when the first engaging protrusion is engaged therewith.

4. The cable binding mechanism according to claim 3, further comprising
   an insertion hole provided through the lateral member on an end of the lateral member at the first arm portion side so that the first arm portion can be inserted when the lateral member extends between the first arm portion and the second arm portion,
   one of the first engaging protrusion and the first guide groove is provided on an inner face of the insertion hole and
   the other of the first engaging protrusion and the first guide groove is provided on a position of the first arm portion corresponding to one of the first engaging protrusion and the first guide groove, which is provided on said inner face.

5. The cable binding mechanism according to claim 4, comprising
   a second engaging protrusion extending longitudinally on one of a position on said inner face other than said position on which one of the first engaging protrusion and the first guide groove is provided, and on a position on the first arm portion other than said position on which one of the first engaging protrusion and the first guide groove is provided, and
   a second guide groove provided on the other of a position on the inner face and on a position on the first arm portion, such that the second engaging protrusion can be longitudinally slidably engaged with the second guide groove, and the second engaging protrusion is guided in the second guide groove when the second engaging protrusion is engaged therewith.

6. The cable binding mechanism according to claim 1, wherein
   the first notch portion and the second notch portion are provided on the outwardly facing faces of the first arm portion and the second arm portion, respectively, opposite to the inwardly facing faces of the first arm portion and the second arm portion facing each other, and
   the first engaging piece and the second engaging piece are provided on positions corresponding to the first notch portion and the second notch portion, respectively.

7. The cable binding mechanism according to claim 1, wherein
   the first engaging piece, the second engaging piece, the first notch portion and the second notch portion are formed such that
   the first engaging piece and the second engaging piece can be moved on the first notch portion and the second notch portion, respectively; accompanied by elastic deformation of the lateral bar, when the lateral member is moved downward relative to the main member when the lateral bar extends between the first arm portion and the second arm portion, and the first engaging piece and the second engaging piece are engaged with the first notch portion and the second notch portion, respectively, when the lateral member is moved upward relative to the main member when the lateral bar extends between the first arm portion and the second arm portion.

8. The cable binding mechanism according to claim 1, wherein on a portion of the lateral member near the first engaging piece and a portion of the lateral member near the second engaging piece, there are provided a first operating protrusion and a second operating protrusion for releasing engagements of the first engaging piece and the second engaging piece with the first notch portion and the second notch portion, respectively.

9. A cable binding mechanism comprising:

a main member having a bottom portion extending laterally;

a spaced apart first arm portion and second arm portion respectively extending upward from two laterally opposed positions on the bottom portion;

a first notch portion and a second notch portion provided on the first arm portion and the second arm portion, respectively;

a lateral member having a lateral bar extending between the first arm portion and the second arm portion for clamping the cable with a bottom portion of the main member;

a first engaging piece and a second engaging piece respectively disposed on both lateral ends of the lateral bar for engaging with the first notch portion and the second notch portion, respectively, to bind and fix the cable with the main member and the lateral member, wherein at least on one of the main member and the lateral member, there is provided a slant preventing portion for preventing the lateral bar from being slanted off from the lateral direction with respect to the bottom portion, when the lateral bar extends between the first arm portion and the second arm portion, and further including a rotation support provided on the upper end of the second arm portion engaging with an end of the lateral member at the second arm portion side, for preventing the lateral member from being separated from the second arm portion wherein the lateral member can be rotated about the end of the second arm portion as a rotation axis.

* * * * *